(12) United States Patent
Kim

(10) Patent No.: US 7,531,985 B2
(45) Date of Patent: May 12, 2009

(54) PACK CASE FOR SECONDARY BATTERY

(75) Inventor: Sun Jae Kim, Youngin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 11/234,844

(22) Filed: Sep. 23, 2005

(65) Prior Publication Data

US 2006/0091850 A1     May 4, 2006

(30) Foreign Application Priority Data

Sep. 24, 2004    (KR)  ...................... 10-2004-0077230

(51) Int. Cl.
*H02J 7/00*      (2006.01)

(52) U.S. Cl. .................... 320/112; 320/107; 429/129

(58) Field of Classification Search ................ 320/107, 320/112, 114; 429/96, 100, 129
See application file for complete search history.

(56) References Cited

U.S. PATENT DOCUMENTS 2,886,623 A * 5/1959 Lehr ........................ 429/98
4,057,677 A * 11/1977 Mabuchi ................... 429/100
5,733,674 A * 3/1998 Law et al. ..................... 429/9
6,546,110 B1 * 4/2003 Vonlanthen ................. 381/330

FOREIGN PATENT DOCUMENTS

JP    2001-143675    5/2001
JP    2002-25633    1/2002

OTHER PUBLICATIONS

Patent Abstracts of Japan, Publication No. 2001-143675; Publication Date: May 25, 2001; in the name of Ogiwara.
Patent Abstracts of Japan, Publication No. 2002-025633; Publication Date: Jan. 25, 2002; in the name of Watanabe.

* cited by examiner

*Primary Examiner*—Akm Enayet Ullah
*Assistant Examiner*—Aaron Piggush
(74) *Attorney, Agent, or Firm*—Christie, Parker & Hale, LLP

(57) ABSTRACT

A pack case for a secondary battery. The pack case includes a frame member having a rectangular shape and a mounting ledge at an inner wall thereof. The pack case includes a dummy block mounted within the frame on one side of the mounting ledge. The pack case allows a single secondary battery to be mounted in a pack case adaptable for two secondary batteries.

11 Claims, 2 Drawing Sheets

PACK CASE FOR SECONDARY BATTERY

CROSS REFERENCE TO RELATED APPLICATION

This application claims priority to and the benefit of Korean Patent Application No. 10-2004-0077230 filed Sep. 24, 2004 in the Korean Intellectual Property Office, the entire content of which is incorporated herein by reference.

BACKGROUND OF THE INVENTION

1. Field of the Invention

The present invention relates to a pack case for a secondary battery. More particularly, the present invention relates to a pack case with an improved arrangement for accommodating a secondary battery therein.

2. Description of the Prior Art

Recently, electronic appliances having compact sizes and light weight, such as cellular phones, notebook computers and camcorders, have been actively developed and produced. Such electronic appliances are equipped with battery packs so that users can use the electronic appliances in various places even if electric power sources are not separately provided for the electronic appliances. The battery pack includes at least one battery capable of outputting an operational voltage having a predetermined level in order to operate the electronic appliances for a predetermined period of time.

Secondary batteries, which are rechargeable batteries, are currently employed in the secondary pack due to their economical advantages. Secondary batteries include Ni—Cd batteries, Ni—MH batteries and Li secondary batteries, such as Li batteries or Li-ion batteries.

In such secondary batteries, most unit cells include an electrode assembly having a positive electrode, a negative electrode and a separator interposed between the positive electrode and the negative electrode. The electrode assembly is accommodated in a can made from aluminum or an aluminum alloy and the can is sealed by means of a cap assembly. After the can has been sealed by the cap assembly, an electrolyte is injected into the can through an electrolyte injection hole, and then the electrolyte injection hole is sealed, thereby completing the fabrication of the secondary battery. Although iron may be used as a material for the can, if the can is fabricated by using aluminum or an aluminum alloy, the secondary battery has a light weight while being resistant to erosion even if the secondary battery is used for a long period of time under high voltage.

The battery pack is constructed using a plurality of unit cells. In general, the battery pack includes a pack case having an insulation property. In addition, a plurality of batteries, wiring circuits for electrically connecting the batteries to each other, safety devices and contact terminals are accommodated in the pack case for the secondary battery.

For example, a sealed unit cell connected with battery accessories and safety devices, such as a positive temperature coefficient (PTC) device, a thermal fuse and a protective circuit module (PCM), may be accommodated in the battery pack. Alternatively, in a state in which the unit cell connects to the PCM and battery accessories, molding resin is filled in gaps formed between the above elements in such a manner that the unit cell, the PCM and battery accessories may be clad or fixed together, thereby forming the battery pack.

The safety devices are connected to positive and negative electrode terminals of the unit cell through a predetermined conductor structure called a "lead" in order to prevent the secondary battery from malfunctioning by the interruption of current applied to the secondary battery when, for instance, the voltage of the secondary battery suddenly rises due to the high temperature in the secondary battery or over-charge/over-discharge of the secondary battery.

However, a conventional pack case for the secondary battery is not available if the number of secondary batteries mounted in the pack case is reduced or increased.

Therefore, a separate pack case adaptable for only one battery must be provided when it is necessary to mount only one secondary battery in the pack case adaptable for two secondary batteries.

In addition, since the size of the pack cases is generally standardized, if only one secondary battery is mounted in the pack case adaptable for mounting two secondary batteries, the secondary battery may not be fixedly mounted in the pack case, so that the secondary battery may not stably connect with the PCM or other battery accessories.

SUMMARY OF THE INVENTION

Accordingly, the present invention provides a pack case for a secondary battery capable of stably connecting secondary batteries with battery accessories even if the number of secondary batteries mounted in the pack case is reduced or increased.

More specifically, a pack case is provided for a secondary battery, the pack case including a frame member having generally rectangular walled enclosure and having a mounting ledge protruding inwardly from an inner wall of the frame member. The frame member encloses a first frame part and a second frame part, the second frame part being laterally adjacent to the first frame part, the first frame part being adapted to mount the secondary battery. The pack case also includes a dummy block adapted to be mounted on the inner mounting ledge in the second part.

According to an exemplary embodiment of the present invention, the dummy block includes at least two flat plate members forming upper and lower surfaces of the dummy block and at least one reinforcement member interposed between flat plate members in order to maintain a thickness of the dummy block in a predetermined level. The thickness of the dummy block is substantially identical to that of the flat plate member.

The dummy block has a shape and a size substantially identical to those of the secondary battery. In addition, the dummy block has a volume substantially identical to that of the secondary battery and is fabricated with an L-shaped structure such that the dummy block surrounds predetermined lateral surfaces of the secondary battery. In one exemplary embodiment, the dummy block is detachably installed in the frame member.

At least one guide protrusion is provided at an inner lower portion of the frame member in order to guide the secondary battery mounted on the frame member. An upper portion of the guide protrusion is rounded with a predetermined curvature.

Lateral surfaces of the dummy block making contact with lateral surfaces of the secondary battery are recessed inward.

DETAILED DESCRIPTION

Figure 1:
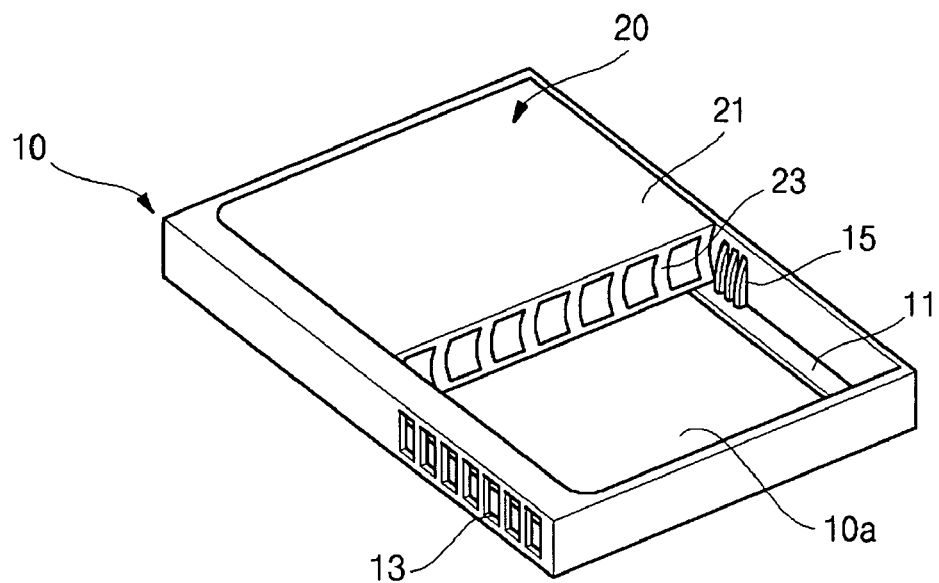
FIG. 1 is a perspective view illustrating a dummy block and a pack case for a secondary battery according to one embodiment of the present invention.
Figure 2:
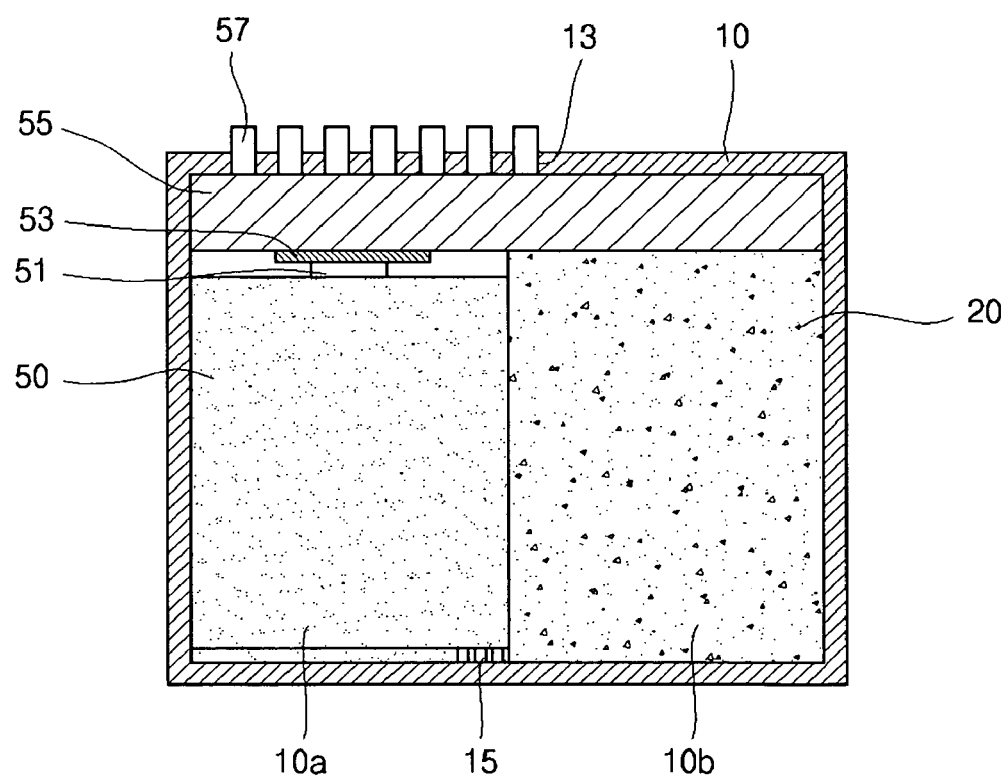
FIG. 2 is a sectional view illustrating a secondary battery mounted in a pack case shown in FIG. 1.

As shown in FIGS. 1 and 2, the pack case according to an exemplary embodiment of the present invention includes a rectangular shaped frame member 10 capable of accommodating at least two secondary batteries 50 therein. Upper and lower portions of the pack case are opened and a mounting ledge 11 is provided at an inner lower portion of the rectangular pack case. In addition, a plurality of terminal holes 13 are formed at one side of the pack case so that electrode terminals 57 connected to the secondary battery 50 are inserted into the terminal holes 13.

If only one secondary battery 50 is mounted in part 10a of the frame member 10 adaptable for accommodating two secondary batteries 50 therein, the secondary battery 50 is mounted on the mounting ledge 11 of the frame member 10 and a dummy block 20 having a shape and a size substantially identical to those of the secondary battery 50 is accommodated in a remaining space, part 10b, of the frame member 10.

The dummy block 20 includes two flat plate members 21 forming upper and lower surfaces of the dummy block 20 and at least one reinforcement member 23 interposed between two flat plate members 21 in order to maintain the thickness of the dummy block 20 substantially identical to that of the secondary battery 50.

The thickness of the reinforcement member 23 may be substantially identical to or larger than that of the flat plate member 21 in such a manner that the flat plate member 21 supported by the reinforcement member 23 may be prevented from being shrunk or depressed due to contact between the flat plate member 21 and the reinforcement member 23.

In addition, one lateral surface of the dummy block 20 making contact with a lateral surface of the secondary battery 50 may have a curved shape which is recessed inward in order to guide contact between the dummy block 20 and the secondary battery 50.

At least one guide protrusion 15 is provided at an inner wall of the frame member 10 in order to guide the secondary battery 50 and the dummy block 20 when they are accommodated in the frame member 10. An upper portion of the guide protrusion 15 may be smoothly rounded with a predetermined curvature.

The guide protrusion 15 is positioned in the frame member 10 such that it makes contact with the secondary battery 50. In order to prevent the dummy block 20 from moving towards an installation position of the secondary battery 50 after the dummy block 20 has been rested on the mounting ledge 11 of the frame member 10, the guide protrusion 15 may make contact with an outer peripheral portion of the dummy block 20.

Accordingly, the secondary battery 50 is accommodated in a first part of the frame member 10 having the guide protrusion 15 and the dummy block 20 having a size and shape substantially identical to that of the secondary battery 50 is accommodated in the second part of the frame member 10.

Figure 3:
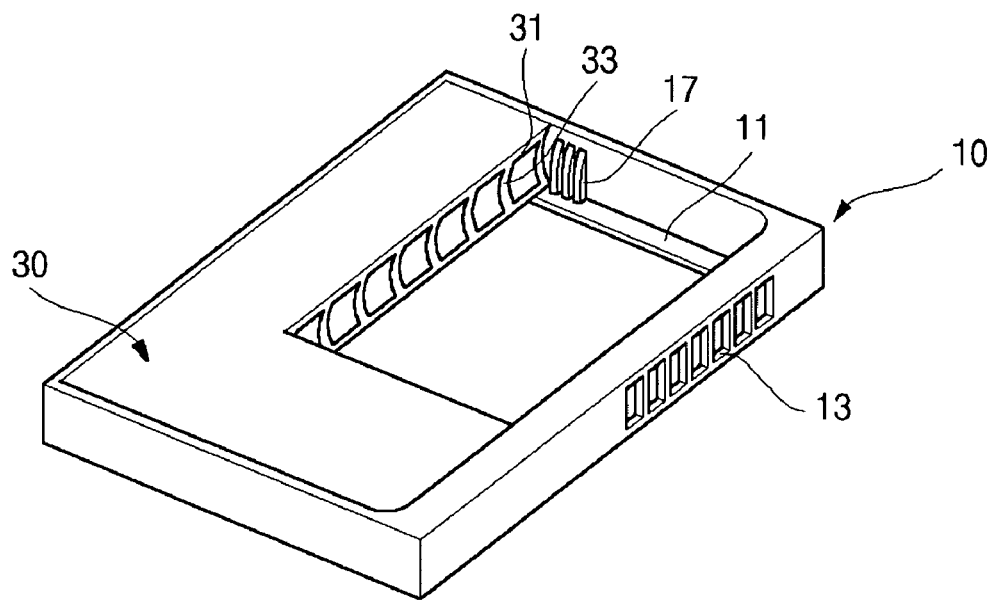
FIG. 3 is a perspective view illustrating a dummy block and a pack case for a secondary battery according to another embodiment of the present invention.

In addition, as shown in FIG. 3, the dummy block 20 may be fabricated in the form of an L-shaped structure with a volume substantially identical to that of the secondary battery 50 such that it surrounds outer peripheral portions of the secondary battery 50 adjacent to the lateral surfaces of the dummy block 20.

The dummy block 20 is detachably coupled to the frame member 10. For instance, if two secondary batteries 50 are accommodated in the frame member 10 as shown in FIG. 1, the dummy block 20 is removed from the frame member 10. However, if only one secondary battery 50 is accommodated in the frame member 10, the dummy block 20 is accommodated in the frame member 10 together with the secondary battery 50. That is, the dummy block 20 is installed in the frame member 10 adjacent to the secondary battery 50. Although FIGS. 1 to 4 illustrate that two secondary batteries 50 are accommodated in the frame member 10, the present invention is not limited thereto. For example, if the frame is adapted to hold three secondary batteries, then at least two dummy blocks may be provided according to another embodiment of the present invention.

Referring to FIG. 2, the pack case for a secondary battery having the above construction includes a protective circuit module 55 installed at a front portion of the frame member 10 and connected to the electrode terminals 57. In addition, an electrode lead wire 53 connected to an electrode terminal 51 is installed on the protective circuit module 55.

The secondary battery 50 may then be mounted on the mounting ledge 11 of the frame member 10 while making contact with the guide protrusion 15 and the dummy block 20 accommodated in the other portion of the frame member 10.

The rounding part provided at an upper portion of the guide protrusion 15 guides the secondary battery 50 while the secondary battery 50 is being mounted on the mounting ledge 11 of the frame member 10. In addition, the guide protrusion 15 supports the secondary battery 50 when the secondary battery 50 has been mounted on the mounting ledge 11.

Therefore, the secondary battery 50 may be prevented from moving by means of the dummy block 20 and the guide protrusion 15, so the electrode terminal 51 of the secondary battery 50 is stably connected to the protective circuit module 55 through the electrode lead wire 53.

Figure 4:
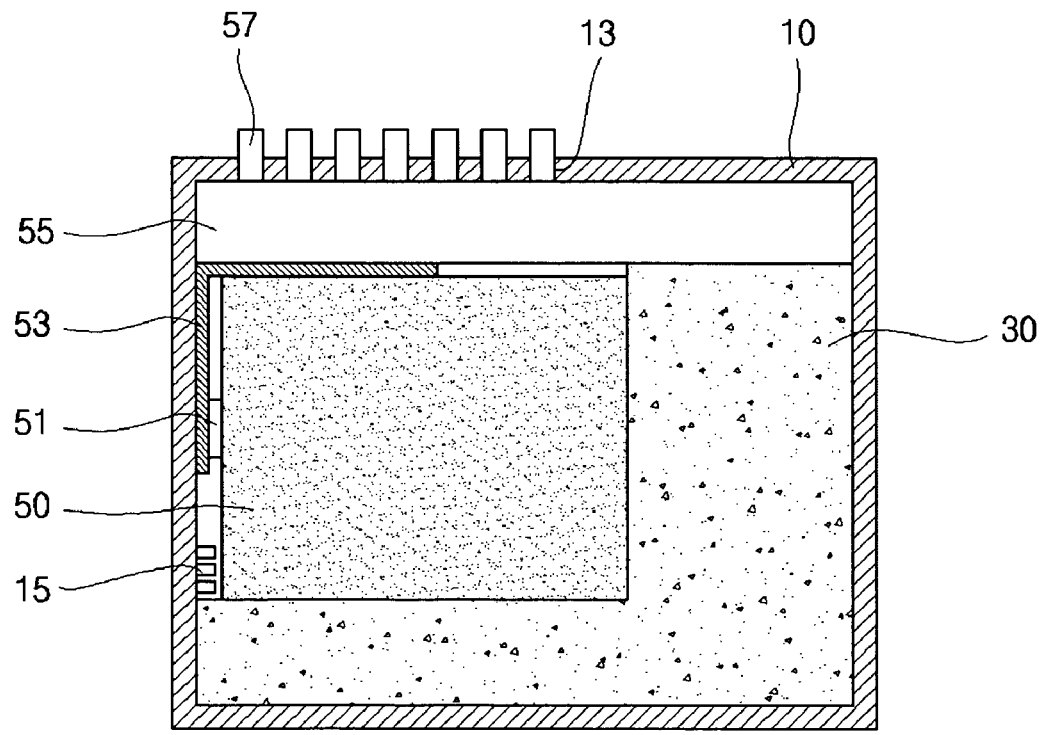
FIG. 4 is a sectional view illustrating a secondary battery mounted in a pack case shown in FIG. 3.

As shown in FIGS. 3 and 4 according to another embodiment of the present invention, the secondary battery 50 is transversely mounted on the mounting ledge 11 of the frame member 10. In this embodiment, a dummy block 30 is fabricated with an L-shaped structure.

The dummy block 30 having an L-shaped structure has a volume substantially identical to that of the secondary battery 50 such that the remaining space of the frame member 10 may be filled with the dummy block 30 after the secondary battery 50 has been transversely installed in the frame member 10.

Thus, the protective circuit module 55, which is connected to the electrode terminals 57 inserted into the terminal holes 13, is installed at a front portion of the frame member 10. In addition, the secondary battery 50 installed in the frame member makes contact with the lateral surface of the frame member 10 and the protective circuit module 55.

The electrode lead wire 53 connecting the electrode terminal 51 of the secondary battery to the protective circuit module 55 is bent at substantially a right angle so that the electrode terminal 51 extending towards a lateral surface of the frame member 10 is connected with the protective circuit module 55 installed at the front portion of the frame member 10 by means of the electrode lead wire 53.

In addition, one side of the dummy block 30 is rested on a long lateral side of the mounting ledge 11 of the frame member 10 and the other side of the dummy block 30 is rested on a short lateral side of the mounting ledge 11 of the frame member 10, thereby surrounding two exposed lateral surfaces of the secondary battery 50.

The lateral surfaces of the dummy block 30 making contact with the exposed lateral surfaces of the secondary battery 50 are recessed inward so as to guide the secondary battery 50 being mounted on the mounting ledge 11 of the frame member 10. At least one guide protrusion 17 is installed at the inner wall of the frame member 10 such that it makes contact with the secondary battery 50 and the dummy block 30. In addition, the rounding part of the guide protrusion 17 provided at an upper portion of the guide protrusion 17 makes contact with the lower surface of the secondary battery 50 and guides the secondary battery 50 while the secondary battery 50 is being installed in the frame member 10.

Therefore, the secondary battery 50 may be prevented from moving by means of the L-shaped dummy block 30 and the guide protrusion 17, so the electrode terminal 51 of the secondary battery 50 is stably connected to the protective circuit module 55 through the electrode lead wire 53.

As mentioned above, according to embodiments of the present invention, the dummy block having the size and shape substantially identical to those of the secondary battery is installed in the pack case capable of accommodating two secondary batteries therein. Thus, it is possible to install only one secondary battery in the pack case.

Accordingly, it is not necessary to provide a separate pack case even if only one secondary battery is mounted in the pack case adaptable for two secondary batteries, so that the manufacturing cost for the pack case may be reduced.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A pack case for a secondary battery, the pack case comprising:
a frame member having a generally rectangular walled enclosure and having a mounting ledge provided at an inner lower portion of the frame member, the frame member enclosing a first area and a second area, the second area laterally adjacent to the first area, the first area being outside the second area and adapted to house a secondary battery housable in the first area; and
a dummy block adapted to be mounted on the mounting ledge in the second area,
wherein at least one guide protrusion is on an inner wall in the first area and is configured to prevent the dummy block from moving towards an installation position of the secondary battery,
wherein an electrically conductive path from the secondary battery housable in the first area to an outside of the frame member is independent of the dummy block, and
wherein a total volume of a volume of the secondary battery plus a volume of the dummy block is substantially identical to an inside volume of the frame member.

2. The pack case as claimed in claim 1,
wherein the dummy block includes at least two flat plate members forming upper and lower surfaces of the dummy block, and
wherein at least one reinforcement member is between the at least two flat plate members for maintaining a thickness of the dummy block.

3. The pack case as claimed in claim 2, wherein the thickness of the dummy block is substantially identical to that of the flat plate member.

4. The pack case as claimed in claim 1, wherein the dummy block has a shape substantially identical to a shape of the secondary battery housable in the first area and a size substantially identical to a size of the secondary battery housable in the first area.

5. The pack case as claimed in claim 1,
wherein the dummy block has a volume substantially identical to a volume of the secondary battery housable in the first area, and
wherein the dummy block is fabricated with an L-shaped structure such that the dummy block is adapted to contact at least one lateral surface of the secondary battery housable in the first area.

6. The pack case as claimed in claim 1, wherein the dummy block is detachably installed in the frame member.

7. The pack case as claimed in claim 1, wherein the at least one guide protrusion is configured to guide the secondary battery housable in the first area in the frame member.

8. The pack case as claimed in claim 7, wherein an upper portion of the guide protrusion projecting inwardly into the first area is rounded.

9. The pack case as claimed in claim 5,
wherein at least one lateral surface of the dummy block is adapted to make contact with at least one lateral surface of the secondary battery housable in the first area, and
wherein the at least one lateral surface of the dummy block is recessed.

10. The pack case as claimed in claim 5, wherein the dummy block is adapted to contact the at least one lateral surface of the secondary battery housable in the first area on a concave side of the L-shaped structure where an angle between a first leg and a second leg of the L-shaped structure is substantially 90 degrees.

11. A pack case for a secondary battery, the pack case comprising:
a frame member having a generally rectangular walled enclosure and having a mounting ledge provided at an inner lower portion of the frame member, the frame member enclosing a first area and a second area, the second area laterally adjacent to the first area, the first area being adapted to house a secondary battery housable in the first area; and
a dummy block adapted to be mounted on the mounting ledge in the second area,
wherein at least one guide protrusion is on an inner wall in the first area and is configured to prevent the dummy block from moving towards an installation position of the secondary battery,
wherein an electrically conductive path from the secondary battery housable in the first area to an outside of the frame member is independent of the dummy block,
wherein the first area is outside of the dummy block, and
wherein a total volume of a volume of the secondary battery plus a volume of the dummy block is substantially identical to an inside volume of the frame member.

* * * * *